United States Patent [19]
Marien et al.

[11] 3,922,773
[45] Dec. 2, 1975

[54] METHOD OF FORMING A HERMETIC ENCLOSURE

[75] Inventors: Jan A. Marien, Raleigh, N.C.; David R. Steinberg, Medfield, Mass.

[73] Assignee: Corning Glass Works, Corning, N.Y.

[22] Filed: July 17, 1974

[21] Appl. No.: 489,460

[52] U.S. Cl. .................................. 29/570; 29/588
[51] Int. Cl.² .................................... B01J 17/00
[58] Field of Search ......... 29/570, 588, 627; 357/74

[56] References Cited
UNITED STATES PATENTS

| | | | |
|---|---|---|---|
| 3,335,335 | 8/1967 | Perkins | 29/570 |
| 3,475,658 | 10/1969 | Howard | 29/570 |
| 3,548,265 | 12/1970 | Buice | 29/570 |
| 3,624,458 | 11/1971 | Howell | 29/570 |

*Primary Examiner*—W. Tupman
*Attorney, Agent, or Firm*—Walter S. Zebrowski; Clarence R. Patty, Jr.

[57] ABSTRACT

A hermetic enclosure for an electrical component, particularly for a tantalum capacitor, and a method of forming it is disclosed. A silver container is provided having an open end at which an outwardly protruding flange is formed. A quantity of sealing glass is sealed to a lead and formed into a bead about the lead intermediate the ends thereof. A metallic member having an aperture therein is provided and the bead is sealed to the surface of the aperture bordering portion of the metallic member. A silver ring is disposed on the surface of the metallic member and the peripheral portion of the metallic member is folded over and pressed into a portion of the silver ring to form a compression seal therebetween. This assembly is disposed adjacent the outwardly protruding flange of the container with the lead extending from within the container to the exterior thereof. The protruding flange is folded over the metallic member so that it contacts the exposed inner portion of the silver ring where it is hermetically sealed to the silver ring.

12 Claims, 7 Drawing Figures

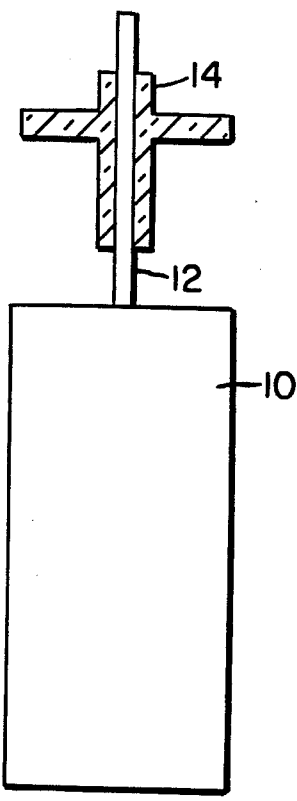
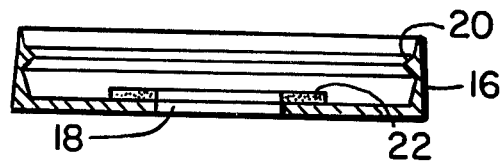
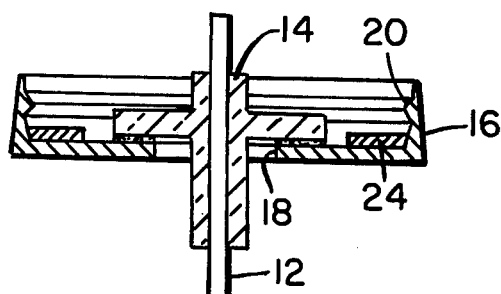
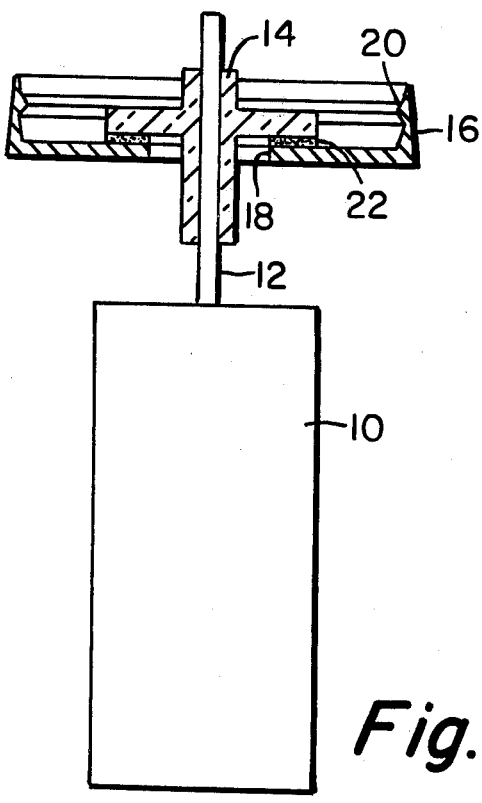
Fig. 1
Fig. 2
Fig. 3
Fig. 4

METHOD OF FORMING A HERMETIC ENCLOSURE

BACKGROUND OF THE INVENTION

1. Field of the Invention

The present invention relates to enclosing of any component but in particular electrical components having a vacuum or containing gaseous or liquid matter which may leak or escape.

2. Description of the Prior Art

In the manufacture of wet tantalum capacitors, it has been necessary to enclose a porous tantalum slug properly positioned within the metal container by means of a plastic sleeve or cup. A substantially liquid acidic electrolyte was disposed in between the slug in the container. A substantially inert plastic element was inserted on top of the slug and the container was crimped to hold the plastic element and thereby the tantalum slug in place. On top of the plastic element, a glass to metal seal would be effected to permit one of the leads to extend beyond the enclosure. The liquid seal takes place between the plastic element and the crimped container walls and perhaps at the glass to metal seal as well. It has been found, however, that such prior art construction permits the leakage of the electrolyte after a period of time through corrosion or otherwise thereby rendering the device inoperative. Furthermore, such construction requires costly equipment and complicated assembly work.

SUMMARY OF THE INVENTION

The objects of this invention are to provide an electronic device enclosure, assembly, and method of manufacture which is economical, provides a hermetic seal for the leads and the container, and overcomes the heretofore noted disadvantages. Broadly, according to the present invention, a silver container open at one end is provided. A unitary outwardly protruding flange is formed at the open end from the container material. To the component lead a quantity of sealing glass is sealed to form a bead around the lead intermediate the ends thereof. A coating of sealing glass is sealed to the aperture bordering portion of a metallic member having an aperture therein. The glass bead is then fused to this glass coating with the lead being disposed within the aperture and extending therethrough, and being spaced from the member. A silver ring is disposed on the surface of the metallic member intermediate the coating of sealing glass and the peripheral portion thereof. The peripheral portion of the metallic member is then folded over so that it engages a portion of the silver ring and is pressed into the silver ring to form a compression seal therebetween, the inner portion of the silver ring remaining exposed. The assembly so formed is then disposed in a manner so that the metallic member is adjacent the outwardly protruding flange of the container with the lead extending from within the container to the exterior thereof. The outwardly protruding flange is then folded over the metallic member so that the flange contacts the exposed inner portion of the silver ring at which point it is hermetically sealed to the silver ring. Additional objects, features, and advantages of the present invention will become apparent to those skilled in the art, from the following detailed description and the attached drawing on which, by way of example, only the preferred embodiment of this invention is illustrated.

BRIEF DESCRIPTION OF THE DRAWING

FIGS. 1 through 5 are cross-sectional views illustrating the various steps leading to the formation of a hermetic enclosure of the present invention.

DETAILED DESCRIPTION

Figure 5:
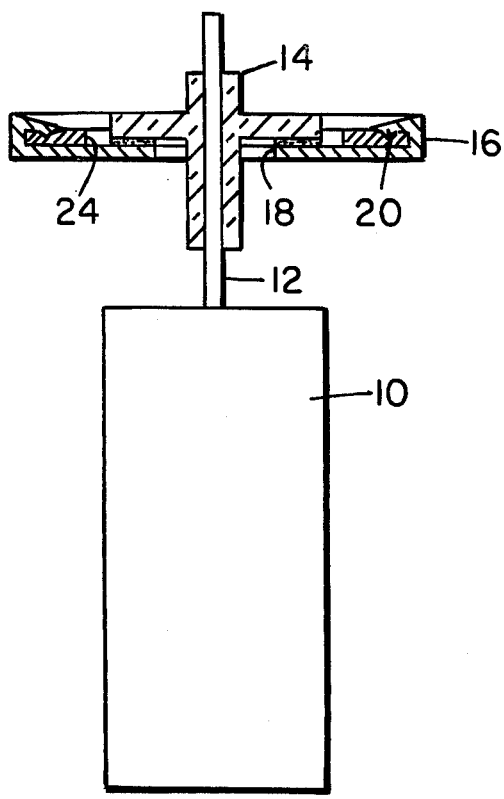

It is to be noted that the drawings are illustrative and symbolic of the invention, and there is no intention to indicate scale or relative proportion of the elements shown therein. For the purposes of simplicity, the present invention will be described in connection with a hermetic enclosure for a wet tantalum capacitor, however, the present invention is in no way limited to such an enclosure, rather it is applicable to any enclosure for an electronic or other device.

Referring to FIG. 1, there is shown a tantalum capacitor slug 10 to which is affixed a tantalum lead 12. As will be understood, tantalum lead 12 is attached to slug 10 by any means known in the art such, for example, as electrostatic welding, sintering the lead into the slug when the slug is sintered, and the like. A quantity of dielectric sealing glass is sealed to lead 12 to form a bead 14 about lead 12 intermediate the ends thereof. One example of a suitable dielectric sealing glass is as follows in weight percent on an oxide basis: $SiO_2$ 71.0%, $ZrO_2$ 16.5%, $Na_2O$ 11.5%, and $Li_2O$ 1.0%. Another example of a suitable dielectric sealing glass is as follows in weight percent on an oxide basis: $SiO_2$ 73.0%, $Al_2O_3$ 3.5%, $B_2O_3$ 11.7%, and $Na_2O$ 11.8%.

In FIG. 2 there is illustrated a metallic member 16 formed with a suitable aperture 18, and protrusion 20 and surfaces prepared to facilitate welding and pressing at the peripheral portion thereof. A coating of glass 22 is sealed to the surface of member 16 at the aperture bordering portion thereof. This glass may be of the same or similar material to that described in connection with glass bead 14.

Referring additionally to FIG. 3, the capacitor lead-glass bead assembly of FIG. 1 is disposed adjacent glass coating 22 and glass bead 14 is fused thereto by means of flame, RF frequency, or other heating so that lead 12 is spaced from the aperture bordering region of member 16. In the formation of a tantalum capacitor, the preferred material for metallic member 16 is tantalum, or any compatible material.

A relatively soft metallic ring 24 is disposed on the surface of member 16 intermediate aperture 18 and the peripheral portion thereof as illustrated in FIG. 4. For tantalum capacitor construction, the preferred material of ring 24 is silver. Thereafter, the peripheral portion of member 16 is folded over and pressed into a portion of metallic ring 24 to form a compression seal therebetween. As will be understood, a protrusion 20 is not necessary on the peripheral portion of metallic member 16, however, such a protrusion permits the peripheral portion of the metallic member to become well embedded in the soft metallic ring 24 facilitating a better compression seal as illustrated in FIG. 5.

Figure 6:
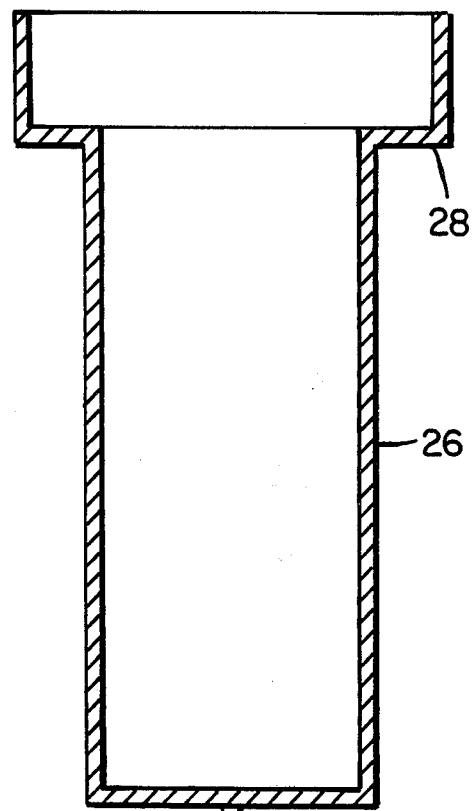
FIG. 6 is a cross-sectional view of the container of the present invention.

Referring to FIG. 6, there is shown housing or container 26 within which capacitor slug 10 will be disposed. The preferred material for housing or container 26 is silver. At the open end of container 26 a unitary outwardly protruding flange 28 is formed.

Figure 7:
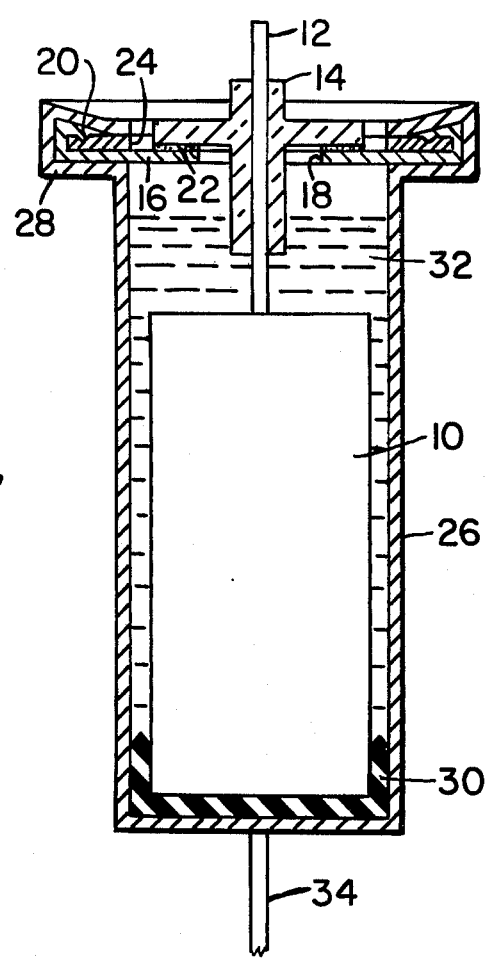
FIG. 7 is a cross-sectional view of an electronic device encapsulated in accordance with the present invention.

Referring now to FIG. 7, there is shown a completed wet tantalum capacitor formed in accordance with the present invention. Porous tantalum slug 10 is disposed in housing 26 and is positioned therein by any means known in the art such as, for example, a synthetic rubber cup-like member or boot 30 formed of a material electrically and chemically compatible with the various materials of the capacitor. An electrolyte gel 32 is disposed within housing or container 26 totally immersing porous tantalum slug 10. After the tantalum slug 10 is positioned within the container and metallic member 16 is disposed adjacent outwardly protruding flange 28, the peripheral portion of flange 28 is caused to be folded over the metallic member so that the flange is in contact with the exposed inner portion of metallic ring 24. As the peripheral portion of outwardly protruding flange 28 is crimped over to make contact with metallic ring 24 it sandwiches the peripheral portion of the metallic member assembly as shown in FIG. 7. The portion of flange 28 making contact with metallic ring 24 is then hermetically sealed by ultrasonic or other welding, or the like in the manner well known in the art. Heat welding is another example of such sealing when the components are not deleteriously affected thereby.

As will be readily understood, tantalum slug 10 forms one electrode of the capacitor while housing 26 forms the other electrode. A second electrode 34 is attached to housing 26 by any means known in the art such, for example, as welding or soldering.

As a typical example, an enclosure is formed by first preparing a cylindrical container or housing of silver. Other compatible materials may also be used. The housing is formed closed at one end so as to have a cavity sufficiently large to receive an electrical component such as a porous tantalum slug. At the open end of the housing an outwardly protruding flange is formed. At the bottom of the housing cavity a cup shaped member formed of Viton, a fluoroelastomer rubber produced by E. I. du Pont de Nemours and Company, Inc. is disposed within which the tantalum slug will be deposited. A tantalum lead is ultrasonically welded to the tantalum slug or may be impressed within the slug during the sintering process thereof. Other mechanical means for attachment may also be suitable. A quantity of sealing glass is sealed to the tantalum lead intermediate the ends thereof to form a glass bead. The dielectric sealing glass is as follows in weight percent on an oxide basis: $SiO_2$ 71.0%, $ZrO_2$ 16.5%, $Na_2O$ 11.5%, and $Li_2O$ 1.0%. A tantalum member having an aperture therein is formed and a coating of the same or similar sealing glass is fused to the surface of the aperture bordering portion of the tantalum member. The glass bead formed on the tantalum lead is sealed to the coating of glass at the aperture bordering portion of the tantalum member. A silver ring is then disposed on the surface of the tantalum member intermediate the coating of sealing glass and the peripheral portion thereof. Thereafter, the peripheral portion of the tantalum member having a protrusion thereat is then folded over so as to engage the outer portion of the silver ring and the peripheral portion with the protrusion thereon is pressed into the silver ring to form a compression seal therebetween.

An electrolyte gel formed of a mixture of 38% sulfuric acid and an anhydrous and particulate colloidal silica material commercially known as Cab-O-Sil available from the Cabot Corporation of Boston, Mass. is disposed within the container. The tantalum slug, with the tantalum lead and tantalum member assembly, is disposed within the container and snuggly fitted within the cup-shaped member in a manner so that the lead protrudes from the open end of the container and the electrolyte gel completely covers the tantalum slug. The outwardly protruding flange of the container is folded over and pressed to contact the silver ring and is then ultrasonically welded thereto.

An external lead of nickel wire or the like may be attached to the tantalum lead by electric welding, while a second lead is attached to the closed end of the housing by silver soldering or the like thereby completing the capacitor.

Enclosures formed in accordance with the present invention are hermetic and do not permit the leakage of an electrolyte gel even under the most severe circumstances.

Although the present invention has been described with respect to details of certain embodiments thereof it is not intended that such details be limitations upon the scope of the invention except insofar as set forth in the following claims.

We claim:

1. The method of forming an enclosure comprising the steps of providing a silver container open at one end, forming from said container material a unitary outwardly protruding flange at the open end of said container, providing a lead, sealing to said lead a quantity of sealing glass to form a bead about said lead intermediate the ends thereof, providing a metallic member having an aperture therein, sealing to the surface of the aperture bordering portion of said metallic member a coating of sealing glass, fusing said glass bead to said glass coating, said lead being disposed within said aperture and extending therethrough and being spaced from said member, disposing a silver ring on said surface of said metallic member intermediate said coating of sealing glass and the peripheral portion thereof, folding said peripheral portion of said metallic member so that it engages a portion of said silver ring, pressing said peripheral portion into said silver ring to form a compression seal therebetween, the inner portion of said silver ring remaining exposed after said pressing, providing a device, connecting said lead to said device, disposing the assembly so formed in a manner so that said metallic member is adjacent said outwardly protruding flange of said container and said device is within said container, said lead extending from said device within said container to the exterior thereof, folding said outwardly protruding flange over said metallic member so that said flange is in contact with said exposed inner portion of said silver ring, and hermetically sealing said flange to said silver ring.

2. The method of claim 1 wherein said peripheral portion embodies a protrusion that is also pressed into said silver ring to effect said compression seal.

3. The method of claim 1 wherein said device is an electrical component.

4. The method of claim 3 wherein said electrical component is a tantalum capacitor slug.

5. The method of claim 4 wherein said lead is formed of tantalum.

6. The method of claim 5 wherein said metallic member is formed of tantalum.

7. The method of claim 6 wherein said outwardly protruding flange is welded to said silver ring.

8. The method of claim 7 further comprising the step of electrically connecting a second lead to said container at the end opposite said open end.

9. The method of claim 1 wherein said lead is formed of tantalum.

10. The method of claim 1 wherein said metallic member is formed of tantalum.

11. The method of claim 1 wherein said outwardly protruding flange is welded to said silver ring.

12. The method of claim 1 further comprising the step of electrically connecting a second lead to said container at the end opposite said open end.

* * * * *